C. JOSEPH.
FASTENER.
APPLICATION FILED NOV. 8, 1909.

1,105,796.

Patented Aug. 4, 1914.

Attest:
E. S. Newton
Clara C. McDonnell

Carl Joseph, Inventor:
by William R. Baird
his Atty

UNITED STATES PATENT OFFICE.

CARL JOSEPH, OF BAYONNE, NEW JERSEY.

FASTENER.

1,105,796.   Specification of Letters Patent.   Patented Aug. 4, 1914.

Application filed November 8, 1909. Serial No. 526,740.

*To all whom it may concern:*

Be it known that I, CARL JOSEPH, a subject of the Emperor of Germany, and resident of Bayonne, Hudson county, and State of New Jersey, have invented certain new and useful Improvements in Fasteners, of which the following is a specification.

This invention relates to fasteners and particularly to fasteners designed to be secured to walls and partitions inaccessible except from the front surface to which the fasteners are to be secured.

Figure 1:
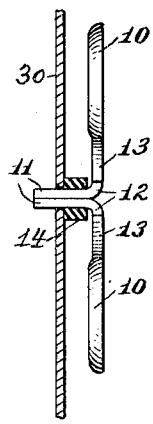
Figure 2:
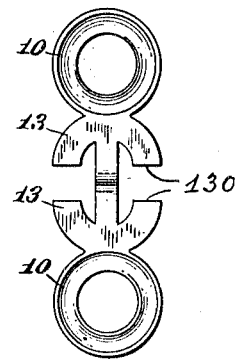
Figure 3:
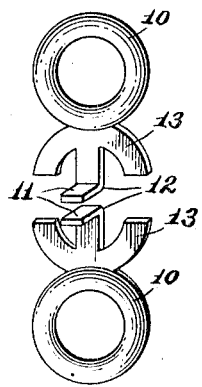
Figure 4:
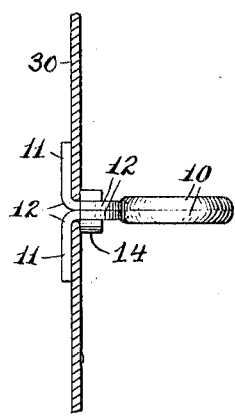
Figure 5:
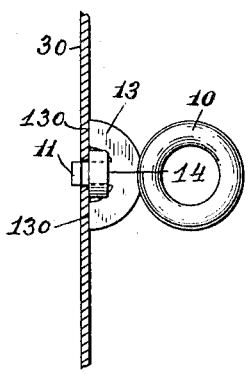

In the drawings, Figure 1 represents a vertical section through a portion of a wall or partition and an edge view of one form of the fastener ready to be secured to the wall; Fig. 2 is a front view of the fastener parts shown in Fig. 1; Fig. 3 is a perspective of the two members of the fastener; Fig. 4 is an edge view of the same showing the two angular arms of the fastener turned away from each other and the fastener secured to the wall; Fig. 5 is a top view of the parts shown in Fig. 4 and a horizontal section through a portion of the wall; Fig. 6 is a vertical section through a portion of the wall and an edge view of a modified form of the fastener ready to be secured to the wall; Fig. 7 is a front view of the fastener parts shown in Fig. 6, and Fig. 8 is a perspective of the two fastener parts shown in Figs. 6 and 7; Fig. 9 is an edge view of these same parts secured to the wall and Fig. 10 is a top view of the parts shown in Fig. 9 and a horizontal section through the wall.

The fastener comprises two members each having a body portion 10 and a projecting arm 11 angularly disposed and forming an L with the body. The two members are alike except for the fact that they are in opposing relation and their projecting arms 11 are turned in opposite directions when in place, as shown in Fig. 4. In the form shown in Figs. 1 to 5, the body portions of each member are substantially flat and are each formed in the shape of a ring or eye, but naturally the size and shape of these parts may vary according to the exigencies of use. Where the projecting arms 11 are turned at an angle to their respective bodies, knuckles 12 are formed so that on such knuckles as bearings each angular arm 11 may turn with respect to the opposite arm 11 and may be moved readily from the position shown in Fig. 1 to that shown in Fig. 4 simply by reason of such rocking or turning motion.

In front of each knuckle 12 each body member 10 is provided with one or more stop arms 13 terminating at 130 in a plane parallel to the projecting arm 11 but in front of the same, it being intended that the inner surface of each arm 11 shall rest substantially against the inner side of the wall or partition 30 to which the fastener is secured and that the outer surface 130 of each arm 13 shall rest substantially against the outer surface of the same wall, the wall 30 being gripped firmly between the two sets of arms and the body 10 of the fastener thus being held securely in position and without tendency to rock or tip.

In practice, a tie device 14, preferably in the form of an elastic ring, or coiled spring, is placed so as to encircle the pair of arms 11 before the fasteners are secured in place. When the fastener has been rocked to position as shown in Figs. 4 and 5 such device 14 will slide from one portion of the arms 11 to the other and will be outside of the wall and between the body of the fastener and the wall. Such device serves as a stop to limit the extent to which the angular arms 11 may be pushed through the opening in the wall and if made of soft elastic material, as rubber, may also serve to seal this aperture in the wall.

It will be noted that spaces 120 are provided in front of the plane of the knuckles 12 and extremities 130 of the arms 13, and between the confronting edges of the arms 11 and 13, to accommodate the tie device when the fastener is in place of use, whereby said arms are permitted to contact with the wall 30 as clearly shown in Fig. 5.

The manner of using the device is obvious. A suitable aperture having been made in the wall or partition 30, the extremities of the arms 11 are passed through it and the parts are in the position shown in Fig. 1. The bodies 10 are then rocked toward each other, the knuckles 12 being in contact. This brings the parts to the position shown in Figs. 4 and 5 and the fastener is securely in place.

What I claim is:

1. A fastener comprising coacting members, each having a stem and an offset holding arm forming a knuckle at their juncture, a tie device that snugly surrounds and connects the members and moves thereon between the stem and the arm past the knuckles as the members pivotally turn on said knuckles, and a stop on one of the stems that limits the movement of the tie device thereon away from the knuckles, said stop overhanging the tie device and being arranged to bear on the article to which the fastener is attached.

2. A fastener comprising co-acting members each having a stem and an offset holding arm forming a knuckle at their juncture, a tie device connecting the members, and a stop carried by one of said stems and spaced sufficiently from the arms to permit the location of the tie on the stems between said stop and the article on which the fastener is mounted.

3. A fastener comprising co-acting members each having a stem and an offset holding arm forming a knuckle at their juncture, a tie device snugly surrounding and connecting the members and movable thereon between the stems and arms past the knuckles, and a stop carried by each stem, said stop being spaced sufficiently from the arms to permit the location of the tie on the stems and in engagement therewith between the stop and the article on which the fastener is mounted.

Witness my hand this first day of November 1909, at New York, N. Y.

CARL JOSEPH.

Witnesses:
E. W. SCHERR, Jr.,
ALAN C. MCDONNELL.

---

Copies of this patent may be obtained for five cents each, by addressing the "Commissioner of Patents, Washington, D. C."